June 10, 1969          J. F. McKINNEY          3,448,765

AUTOMATIC PULSE VALVE

Filed Sept. 7, 1965

*INVENTOR.*
JOHN F. McKINNEY
BY
*J. Warren Kinney, Jr.*
ATTORNEY

United States Patent Office 3,448,765
Patented June 10, 1969

3,448,765
AUTOMATIC PULSE VALVE
John F. McKinney, Des Moines, Iowa, assignor to Intercontinental Chemical Corporation, Cincinnati, Ohio, a corporation of Ohio
Filed Sept. 7, 1965, Ser. No. 485,171
Int. Cl. F16k 17/04, 21/04, 1/00
U.S. Cl. 137—513.5          5 Claims

ABSTRACT OF THE DISCLOSURE

The valve controls automatically a flow of liquid therethrough, and is manually adjustable exteriorly of the valve body with primary and secondary adjustability of flow rate. The valve may be purged both manually and automatically, at various flow rate settings selected. A longitudinally slidable plunger provides for quick-action manual purging without disturbing the previously selected adjustable flow rate setting to which the plunger returns after each purging of the valve. Simplicity and reduction of the number of parts employed characterize the valve structure.

---

The present invention relates to an automatic pulse valve.

The automatic pulse valve is a valve such as might be incorporated in a liquid distribution system, to normally pass a metered quantity of liquid to a terminal area, and at times, permit a momentary increased flow to purge the valve and its output connections to said terminal area.

In a typical application, a lubricating system may include a supply pipe feeding a series of branch pipes, the branch pipes being directed to different areas requiring lubrication. A pulse valve of the present invention may be connected in each branch pipe, to control flow of lubricant to the several different areas, and the several different areas may demand lubricant in different quantities. It may be desirable in such a system, therefore, to provide pulse valves which are individually adjustable to pass a liquid at different rates of flow, to the several use areas or terminals to be lubricated.

An object of the present invention is to provide an automatic pulse valve which may be adjusted to pass either a steady flow of liquid, or a few drops at a time, with great accuracy of flow adjustment.

Another object of the invention is to provide an adjustable valve of the character stated, which may be purged along with its output pipe, without disturbing the accurate flow adjustment for which the valve was originally set.

Another object to is to provide in an automatic pulse valve of the type referred to, structural improvements whereby all vital movable parts are isolated from the liquid being controlled, thereby to prevent malfunctioning of the valve due to possible deleterious effects of the liquid controlled thereby, and entry of dirt or other foreign matter.

A further object of the invention is to provide in an automatically purgible valve of the character stated, a manually operable means for purging the valve and its connections, without disturbing the fine flow control adjustment of the valve.

Another object is to provide an automatic pulse valve which incorporates highly desirable improvements assuring trouble-free operation, and great accuracy of flow control, with the use of simple and inexpensive components advantageously arranged and coordinated.

The foregoing and other objects are attained by the means described herein and as illustrated upon the accompanying drawing, in which.

Figure 1:
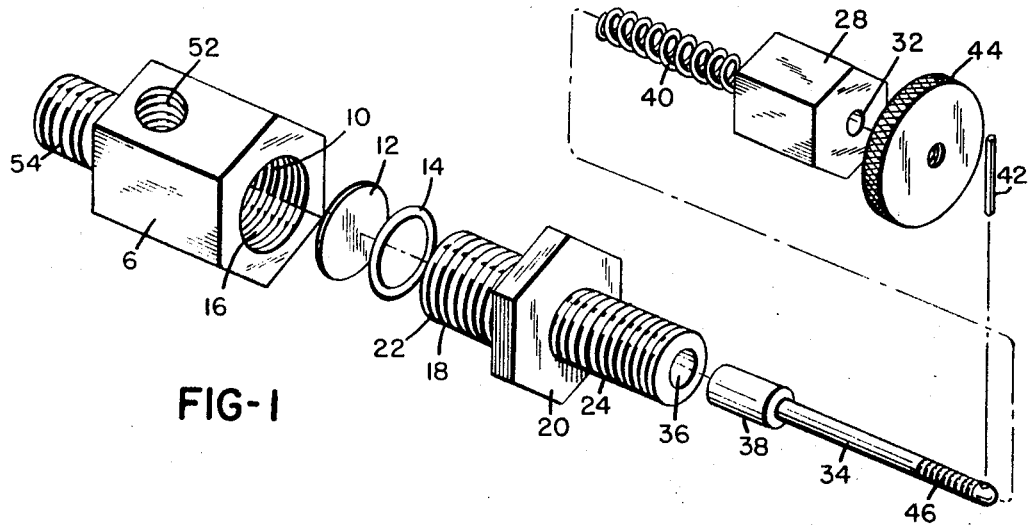
FIG. 1 is an exploded perspective view of the automatic pulse valve, incorporating the improvements of the present invention.

The valve comprises a body 6 bored longitudinally as at 8, to provide an inlet port for a lubricant or other liquid supplied thereto normally under pressure. The body may be counterbored concentrically with inlet port 8, to provide a diaphragm chamber 10 in which is supported a flexible diaphragm 12 of disc formation, fashioned from a pliable sheet material which is impermeable to and undestructible by the liquid entering the inlet port.

Diaphragm 12 is supported across chamber 10, and sealed as by means of a gasket or O-ring 14, to prevent liquid passing from port 8 to a location beyond or to the right of the diaphragm. Chamber 10 may be interiorly screw-threaded as at 16, to receive the exterior threads 18 of a bonnet 20. Threads 18 are formed on the gland 22 of the bonnet, and the gland may be drawn forcefully endwise against gasket 14 and the adjacent peripheral margin of diaphragm 12, to prevent leakage of fluid past the diaphragm.

The neck 24 of the bonnet, which is disposed exteriorly of the valve body, may carry exterior screw threads 26 onto which may be threaded a primary adjusting cap 28. Cap 28 has an internally threaded enlarged bore 30 to engage the threads of neck 24, so that the cap may be located at selected positions along the length of neck 24, by rotating the cap.

A bore 32 of reduced diameter, formed in cap 28 concentrically with bore 30, slidably and rotationally supports a spring-loaded flow-control plunger 34, which plunger extends through the axial bore 36 of bonnet 20, to reach and contact the diaphragm 12. The plunger may carry an enlarged head 38 abutting the diaphragm, the head being slidable in bore 36. By means of a compression spring 40 surrounding the plunger, head 38 normally is pressed against diaphragm 12 with a force that is variable by rotating the cap 28 and changing its position along the length of neck 24.

Figure 2:
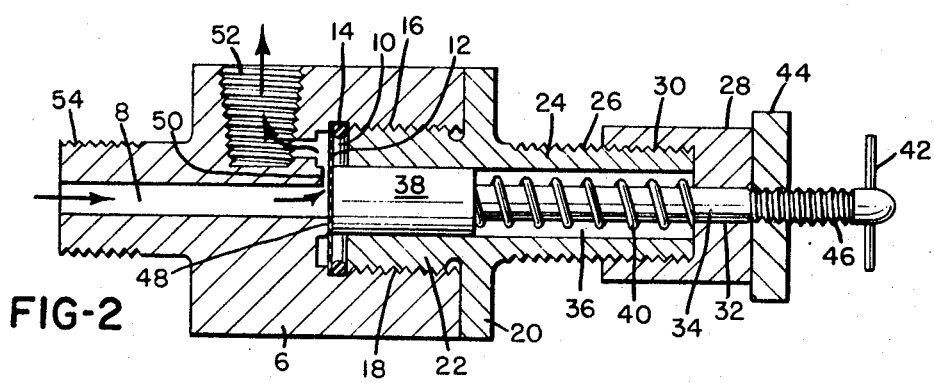
FIG. 2 is a longitudinal cross-section of the valve assembled and in condition for normally controlling a flow of liquid therethrough.

In FIG. 2, spring 40 is shown at maximum compression due to the fact that cap 28 is fully advanced upon neck 24. By unscrewing cap 28 and thereby retracting it toward the right, the force of spring 40 acting upon head 38 to depress diaphragm 12, may be reduced and adjusted. Opposite ends of spring 40 bear against head 38 and cap 28, as will be understood.

Means may be provided for manually and instantly withdrawing plunger head 38 from the rear face of diaphragm 12, against the force of spring 40. Such means may comprise a handle or finger grip 42 secured to the outer end of plunger 34, whereby the plunger may be bodily shifted to the right as in FIG. 3. In so shifting, the plunger carries with it a fine adjustment stop nut 44 mounted upon the plunger. The stop nut is selectively positionable axially upon the plunger, to adjust and limit the extent to which the compression spring 40 may advance plunger head 38 against the diaphragm 12. In the embodiment illustrated, the nut or stop 44 is screwthreaded onto the outer end portion 46 of plunger 34, so that by rotating it relative to the plunger, the nut or stop may be poised at selected locations along the plunger end 46.

As indicated by FIG. 2, the adjustable stop 44 is normally in abutment upon the outer end of cap 28. From the foregoing explanation, it will be understood that an operator may grasp handle 42, retract the plunger 34 to the FIG. 3 position, and restore the plunger to the FIG. 2 position, without disturbing the adjustments of parts 28 and 44. The purpose of such manipulation will be more fully explained hereinafter.

Reverting to the structure of valve body 6, it will be noted that bore 8 terminates at an annular valve seat 48 against which the diaphragm 12 normally is urged by the spring-loaded plunger head 38, FIG. 2. Preferably, through not necessarily, valve seat 48 may be radially notched as at 50 to permit slow leakage of fluid from inlet port 8 to outlet port 52, when diaphragm 12 is urged onto seat 48. Such fluid leakage may be directed to any mechanism or area of use, by means of piping or tubing connected with outlet port 52. For example, the fluid released may be some form of lubricating solution to be fed either continuously, or drop by drop, under the control of the valve disclosed.

The rate at which fluid passes normally through the valve, may be governed by the size of notch 50 and the force of spring 40 as determined by the adjusting devices 28 and 44. If valve seat 48 is formed without a notch such as 50, then the force with which plunger head 38 presses diaphragm 12 against said seat will determine the rate of flow through the outlet port, assuming of course, that pressure of fluid at the inlet is sufficient to at least partially displace the diaphragm from seat 48.

The operation of the device is as follows. The threaded inlet port nipple 54 may be connected to a supply pipe feeding a lubricant or other liquid to be dispensed through the valve. The outlet port 52 may be connected with a pipe or tube leading to an article or area to be treated. Liquid supplied to inlet 8 should be under pressure, either constantly or intermittently.

Cap 28 and stop nut 44 will be adjusted longitudinally of plunger 34, to compress spring 40 and advance plunger head 38, for urging diaphragm 12 onto the valve seat 48 with that amount of force which is necessary to control flow of liquid past the seat. The flow may be copious, or very limited, depending upon the adjustments made at cap 28 and nut 44. A system of lubrication might incorporate any number of flow control valves, and each valve may be adjusted individually to provide a different rate of flow.

The nature of the lubricant or other liquid metered by the valve, may be such that congelation or other physical change might occur at the point of use, or even within the valve itself, making necessary a purging of the valve and its distribution system from time to time. Purging may be accomplished by increasing the pressure of fluid in the distribution system. Such increase of pressure will act upon diaphragm 12 to displace the plunger head 38 in accordance with FIG. 3, thereby inducing a rapid flow of fluid through the valve and the distribution system to clear therefrom any undesirable deposits or accumulations.

The fluid pressure increase above mentioned may be in the form of a sudden burst, or possibly a sustained increase for a short period of time, this being a matter of choice or judgment in any particular installation. In either case, the purging operation overcomes the normal setting of the valve (FIG. 3) to assure rapid flow of liquid therethrough. However, the purging action cannot change the adjustment of cap 28 relative to the bonnet neck 24, nor the adjustment of nut 44 relative to plunger 34. As a consequence, when pressure of fluid in the system is reduced to normalcy, the movable parts of the valve will return automatically to the FIG. 2 position, assuring the originally prescribed metering of fluid by the valve precisely as it occurred prior to purging.

Figure 3:
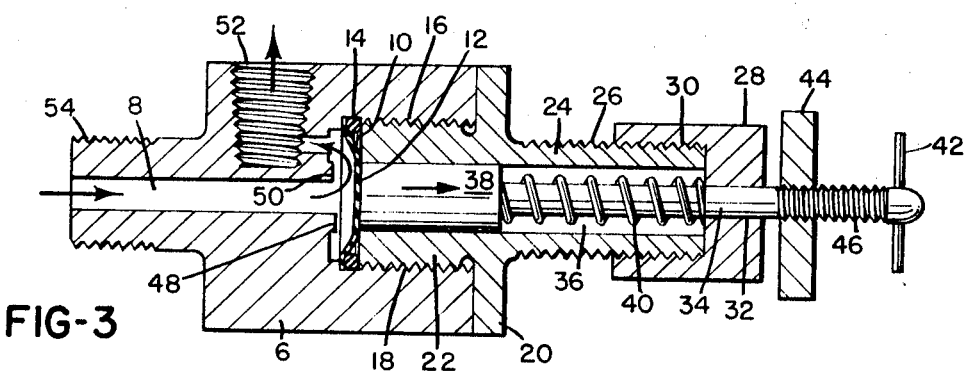
FIG. 3 is a view similar to FIG. 2, but showing the valve undergoing automatic purging by means of a pressure increase at the valve inlet.

In the event that an operator or attendant wishes to manually purge a valve or its discharge piping, he may do so by grasping the handle 42 and shifting the valve parts to the FIG. 3 position, thereby inducing a full flow of fluid through the valve. Upon release of handle 42 by the operator, metering of fluid will be resumed at the exact rate originally prescribed by the valve adjustments.

The valve as herein disclosed is found highly reliable and effective in service, and practically free of maintenance considerations. The diaphragm 12, being sealed about its entire periphery, prevents entry of dirt or any foreign substance to the area of valve seat 48. Also, the diaphragm precludes leakage of fluid from inlet port 8 to the bonnet end of the valve, where fluid might cause sticking of the plunger or other malfunction tending to reduce reliability of service.

In a preferred embodiment of the invention, the threaded connection between adjusting nut 44 and the outer end portion 46 of plunger 34, incorporates screwthreads of lesser pitch than that of cap 28, so that a fine adjustment of the force of spring 40 may be obtained by rotating the adjusting nut 44. If desired, the end portion 46 of the plunger may be fitted with a lock nut or other device for fixing the position of adjusting nut 44 upon the plunger after adjustment. Cap 28 also might be locked to neck 24 after final adjustment, utilizing a lock nut or equivalent means for the purpose. The plunger or stem of the valve requires no packing or sealing.

What is claimed is:

1. An automatic pulse valve for controlling flow of a liquid under pressure, comprising in combination: a valve body having a diaphragm chamber, an inlet port having a terminus within said chamber, and an annular seat surrounding said terminus, a flexible diaphragm having a central portion and a peripheral margin, means securing the margin of the diaphragm within the diaphragm chamber, with the central portion thereof overlying the annular seat aforesaid, an outlet port in the valve body having a terminus in the diaphragm chamber adjacent to the annular seat of the inlet port, an elongate plunger having an inner end and an outer end, and means supporting said plunger for axial sliding movement with the inner end of the plunger abutting the central portion of the diaphragm, yielding means, and further means coacting with said yielding means for adjusting said yielding means as to force operative upon the plunger to press the diaphragm toward the annular seat of the inlet port, in opposition to pressure of liquid in the inlet port for controlling flow of liquid from the inner terminus of the inlet port to the inner terminus of the outlet port, and adjustable stop means, accessible exteriorly of said valve body and cooperating with said plunger and said further means, for limiting the extent of axial sliding movement of the plunger toward said diaphragm enforced by said yielding means.

2. The device according to claim 1, wherein the combination includes a handle on the outer end of the elongate plunger, for withdrawing the inner end of the plunger from the diaphragm against the force of the yielding means, to purge the valve.

3. An automatic pulse valve for controlling flow of a liquid under pressure, comprising in combination: a valve body having a diaphragm chamber, an inlet port having a terminus within said chamber, and an annular seat surrounding said terminus, a flexible diaphragm having a central portion and a peripheral margin, means clamping and sealing the margin of the diaphragm within the diaphragm chamber with the central portion thereof overlying the annular seat aforesaid, an outlet port in the valve body having a terminus in the diaphragm chamber intermediate the annular seat of the inlet port and the peripheral margin of the diaphragm, an elongate plunger having an inner end and an outer end, and means supporting said plunger for axial sliding movement with the inner end of the plunger abutting the central portion of the diaphragm, and yielding means operative upon the plunger to press the diaphragm toward the annular seat of the inlet port in opposition to pressure of liquid in the inlet port for controlling flow of liquid from the inner terminus of the inlet port to the inner terminus of the outlet port, said yielding means including adjusting means accessible exteriorly of the valve body for adjusting the force thereof with which the diaphragm may be pressed thereby against the annular seat of the inlet port, and adjustable stop means accessible exteriorly of said valve body and cooperating with said plunger and said adjusting means for controlling the force applied to said diaphragm against the annular seat by said adjusted yielding means.

4. An automatic pulse valve for controlling flow of a liquid under pressure, comprising in combination: a valve body having a diaphragm chamber, an inlet port having a terminus within said chamber, and an annular seat surrounding said terminus; a flexible diaphragm having a central portion and a peripheral margin; a bonnet including a gland and a neck exteriorly screw-threaded and axially bored, the gland being receptive in the diaphragm chamber of the body and disposed in clamping and sealing arrangement with the margin of the diaphragm, with the central portion of one face of the diaphragm overlying the annular seat aforesaid; an outlet port in the valve body having a terminus in the diaphragm chamber adjacent to the annular seat of the inlet port; an elongate plunger slidable in the bore of the bonnet, said plunger having an inner end abutting the opposite face of the central portion of the diaphragm, and an outer end extending beyond the neck of the bonnet, said outer end being screw-threaded along a portion of its length; an adjustable cap having a bore loosely supporting the threaded end of the plunger, and a recess in said cap having internal threads engaged with the threads of the bonnet neck, whereby the cap may be rotated relative to the neck and positioned at selected locations along the length of the neck; an adjusting nut in threaded engagement with the threads of the plunger, and rotatable thereon to dispose the nut at selected locations endwise of the plunger; a compression spring in the neck bore surrounding the plunger, said spring having one end abutting the adjustable cap within the cap recess, and an opposite end impinging upon a portion of the plunger to yieldingly advance the inner end of the plunger against the central portion of the diaphragm in the direction of the annular seat, and to yieldingly maintain the adjusting nut normally in abutment upon the adjustable cap carried by the bonnet neck.

5. The device according to claim 4, wherein is included means to manually shift the plunger away from the diaphragm and the annular seat covered thereby.

References Cited
UNITED STATES PATENTS

| | | | |
|---|---|---|---|
| 1,239,022 | 9/1917 | McClean | 137—543.13 X |
| 2,056,249 | 10/1936 | Bystricky | 137—513.5 X |
| 2,372,456 | 3/1945 | Stewart | 137—513.5 X |
| 2,743,552 | 5/1956 | Hunter | 137—513.5 X |
| 3,251,633 | 5/1966 | Mohsin | 138—43 X |

ALAN COHAN, *Primary Examiner.*

D. J. ZOBKIW, *Assistant Examiner.*

U.S. Cl. X.R.

137—543.13; 251—321